INVENTORS.
William E. Urschel
Gerald W. Urschel
By:- Cox & Moore ATTORNEYS.

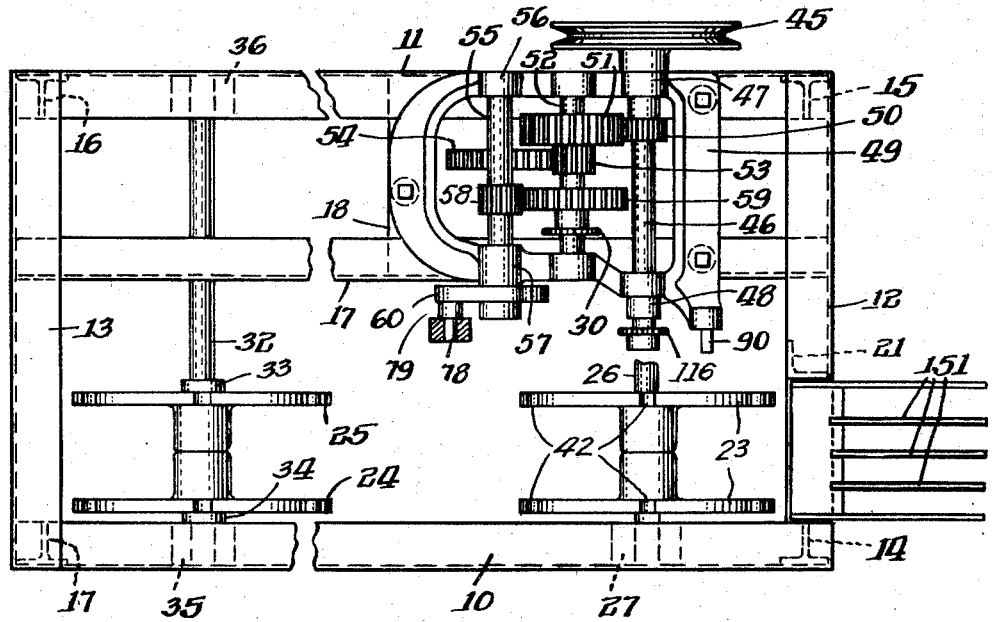

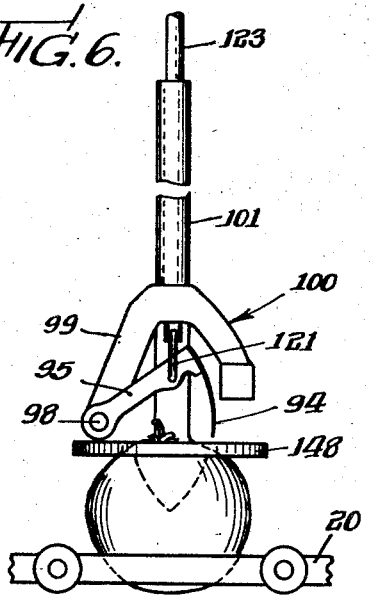
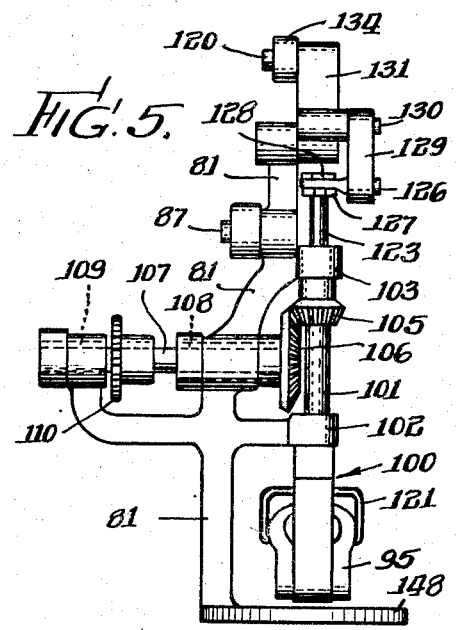
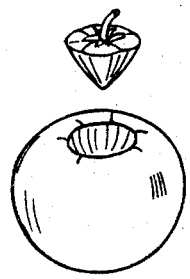
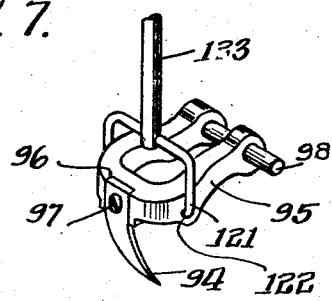

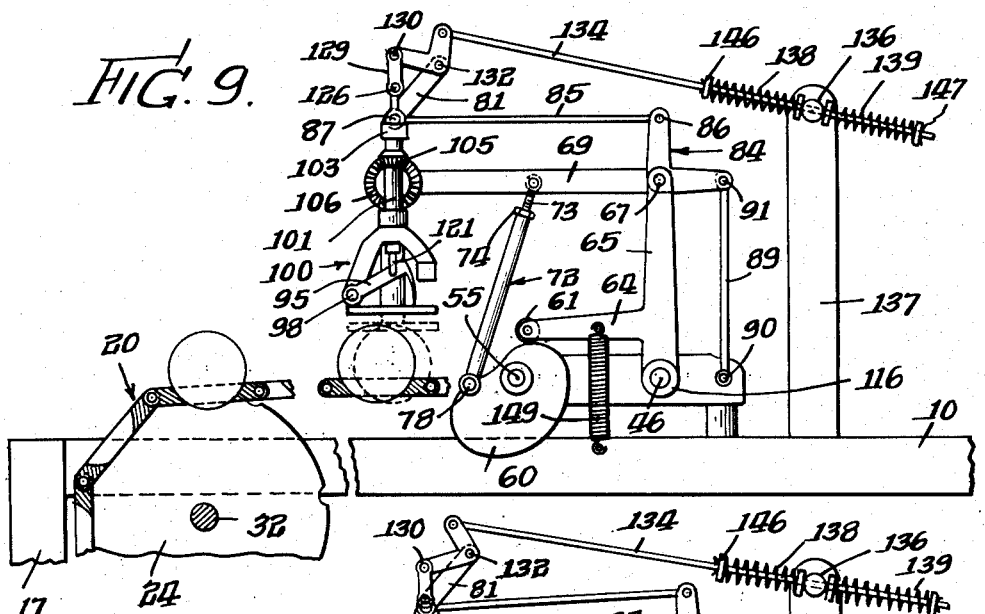
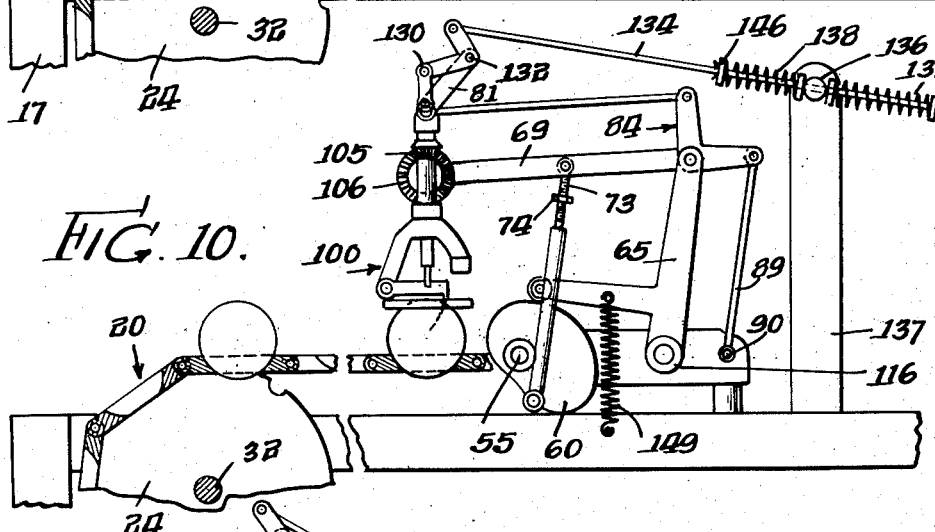
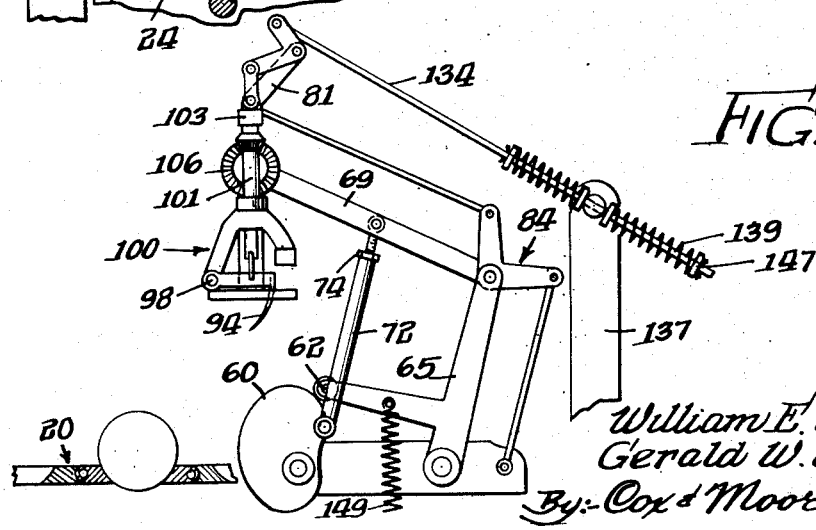

Patented Aug. 19, 1941

2,252,951

UNITED STATES PATENT OFFICE 2,252,951

TOMATO CORER

William E. Urschel and Gerald W. Urschel, Valparaiso, Ind.

Application January 18, 1939, Serial No. 251,595

20 Claims. (Cl. 146—52)

This invention relates to devices for coring fruits and vegetables. In particular it relates to a device for removing the stem and that portion of the core of a tomato that is objectionable for either canning or for squeezing the tomato to secure the juice therefrom. In either instance, the stem and the core impair the flavor of the juice or the canned product.

Among the objects of the present invention are to core and destem a fruit or vegetable, such as a tomato, without unduly injuring the seed cells and thereby causing the bleeding of the juice; to provide a mechanism for coring tomatoes in such a manner that the stem portion of the tomato is disposed upwardly and in a manner so as to prevent the escape of the juices of the tomato during the coring operation; to provide a coring mechanism for tomatoes, fruits and other vegetables whereby the coring mechanism is automatically controlled with regard to the depth of cut required for different sized tomatoes; to provide a mechanism for coring tomatoes wherein the pressure of the mechanism holding the tomato while being cored is the same on various sized tomatoes; to provide a coring mechanism for tomatoes and the like wherein a succession of tomatoes are continuously carried past a coring station, and wherein a coring mechanism is caused to approach in a direction normal to the movement of the succession of tomatoes, and is caused to register with a held tomato in a manner to provide complementary holding means therefor, and wherein the coring mechanism and the auxiliary holding means are caused to travel at the same rate of speed as the tomato and parallel thereto while in contact therewith, during which time the coring operation is carried out, and whereupon the coring mechanism and auxiliary holding device will then retreat in straight-line motion from the cored tomato, will return to be positioned directly over the next succeeding tomato in the continuously travelling line, and will repeat the cycle of operations with respect to each such succeeding tomato; to provide a coring mechanism and auxiliary holding device for an automatic coring machine for tomatoes, wherein the tomatoes move in an endless, continuous succession, and wherein the coring mechanism and the auxiliary holding mechanism approach each tomato in a direction normal to the movement of the tomato, whereby to contact and hold the tomato between opposed tomato-holding surfaces, and in such a manner that the axis of the tomato is not disturbed, whereby an accurate coring operation may be carried out and whereby the juice of the cored tomato is prevented from being spilled; to provide a substantially high-speed automatic coring mechanism for tomatoes which is adapted to core a succession of tomatoes as they pass along a conveyor in continuous, uninterrupted fashion, whereby the coring mechanism in certain phases of its operation is adapted to travel with the conveyor in uninterrupted fashion and in other phases of its action is adapted to retreat from the conveyor, move more rapidly in an opposing direction, and then return exactly at right angles to the conveyor to approach the next succeeding tomato, all without interrupting the continuous movement of the succession of tomatoes; to provide an automatic tomato coring machine involving the utilization of a continuously moving conveyor adapted to form a series of spaced apart, continuously moving tomato-holding members or sockets, wherein there is associated therewith an auxiliary tomato-holding member and coring mechanism constructed and arranged whereby the holding mechanism is adapted to approach and contact tomatoes by gravity and in a straight-line movement normal to the line of movement of the tomatoes and whereby the balance of the machine is such that no undue weight of the coring mechanism is placed upon the tomatoes during the contacting operation of the auxiliary holding mechanism, and wherein when such auxiliary holding mechanism contacts a tomato, further approaching movement of the coring mechanism will cease, whereupon a rotating coring mechanism will descend upon and cut a conical section from the upper surface of the tomato to remove the stem and objectionable portion of the core; to provide a coring mechanism for tomatoes adapted automatically to remove a conical core section from the upper surface of the tomato whereby to provide a cup-shaped recess to receive juices resulting from the cut, and whereby such juices are prevented from being spilled; to provide an automatic coring device for tomatoes utilizing a travelling holding cup for the tomato, adapted continuously to move the tomato in a horizontal plane, and an associated holding member adapted to approach the upper portion of the tomato in a straight-line movement normal to the line of movement of the tomato to hold the upper portion of the tomato, and an associated coring mechanism adapted to operate through the aperture of the auxiliary holding mechanism and adapted to be rotated and likewise to be projected through such opening to core a conical section or core from the top of the tomato; to provide a coring mechanism for tomatoes including the mounting of an auxiliary tomato holding and coring head upon a shiftable link mechanism comprising a vertically disposed parallelogram of links and a horizontally disposed parallelogram of links, which permit the rotatable coring cutter and the holding mechanism to remain perpendicular to the tomato conveyor at all times, whereby the coring mechanism may constantly revolve about an axis normal to the conveyor whereby to provide an exact coring of the tomato; to provide a tomato coring mechanism wherein the tomato cores removed by the knife are thrown tangentially from the rotating knife as said knife moves away from the tomato after the core has been cut; to provide these and other objects of invention as will be more particularly made apparent from a perusal of the following specification when taken in connection with the accompanying drawings.

Referring now to the drawings:

Fig. 1 shows a side illustration of the preferred form of the device;

Fig. 2 is a plan view of the main frame and driving mechanism of such machine;

Fig. 5 is a front elevation of the coring knife holding bracket or head and a portion of the driving mechanism for the coring mechanism;

Fig. 6 is a side illustration of the coring knife, with a portion of the holder for said knife and a portion of the conveyor used to convey the tomatoes to said knife being shown;

Fig. 7 is a perspective view of the coring knife blade and knife holder;

Fig. 8 is a perspective view of a tomato with the core removed, showing the conical nature of the core; and Figs. 9, 10 and 11 illustrate successive positions of the mechanism illustrated in Fig. 3 in carrying out a portion of the cycle of coring operations.

Figure 3:
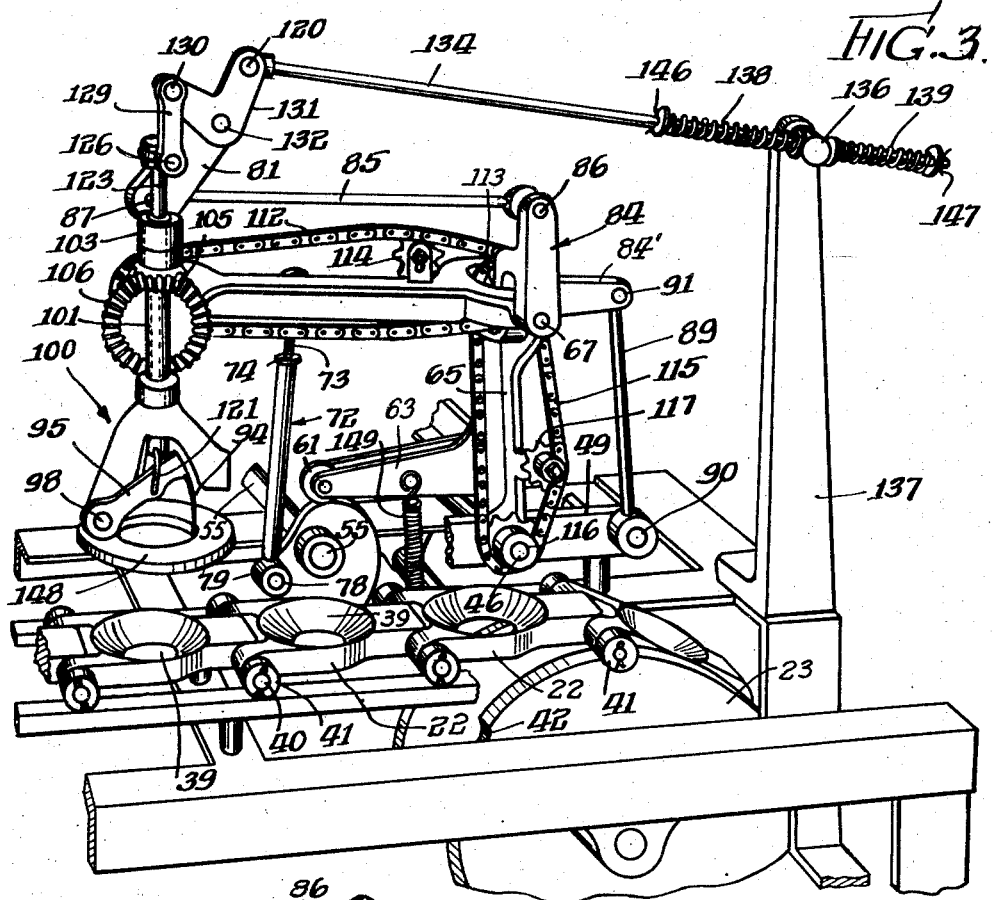
Fig. 3 is a perspective view of the forward end of the machine, viewing it from the side of the machine as illustrated in Fig. 1.

Referring now to the drawings in detail, the machine embodies a main frame consisting of two parallel angle members 10 and 11 disposed longitudinally and held in spaced relation by two transverse members 12 and 13, welded or otherwise secured to members 10 and 11. In addition, the frame includes four substantially T-shaped members 14, 15, 16 and 17, secured to respective corners of the rectangular frame formed by members 10 to 13, inclusive, and these T-shaped members serve as legs or supports. Additional longitudinally and transversely disposed members 18 and 19 serve to make the frame more rigid. A transversely disposed frame member 20, positioned below frame member 12, is welded at each end to forward legs 14 and 15. A vertically disposed member 21 is secured at its lower end to member 20 and at its upper end to transverse member 12, and serves to support one extremity of the member 12.

The present form of the invention includes a conveyor mechanism for continuously and uninterruptedly conveying a spaced succession of tomatoes to the coring mechanism of the machine. This conveyor mechanism consists preferably of a plurality of chain links 22 driven by two forwardly located chain sprockets 23, which chain links idle upon two chain sprockets 24 and 25. The drive chain sprockets 23 are keyed to a shaft 26 which in turn is journalled in suitable brackets, not shown, secured to the frame members 10 and 11, respectively. In addition, keyed to shaft 26 is a suitable sprocket, not shown, which is in line with a sprocket 30 shown in Fig. 2. This sprocket 30 drives the shaft 26 by means of a drive chain, not shown, thus providing means for continuously actuating the conveyor 20. Idler sprockets 24 and 25 are rotatably mounted upon a shaft 32, being positioned upon said shaft by collars 33 and 34. The extremities of shaft 32 are slidably mounted in take-up brackets 35 and 36 secured to the frame members 10 and 11. Two identical cap screws 37, see Fig. 1, in association with brackets 35 and 36, provide means to move shaft 32 in said brackets, thereby taking up slack in the conveyor 20.

The chain links 22 are provided with circular concave pockets 39, as illustrated more clearly in Fig. 3, and are adapted and shaped readily to receive tomatoes and in a manner to hold the tomatoes horizontally, with their stems extending vertically. The concavity of these pockets 39 tends to center each tomato with its stem extending vertically.

Pins 40 are secured in the forward portions of the links 22, upon the extremities of which are journalled the rear portions of the next preceding link 22. Rollers 41, secured to the extremities of these pins 40, coact with semicircular portions 42 on the sprockets 23 for driving the conveyor 20.

Figure 4:
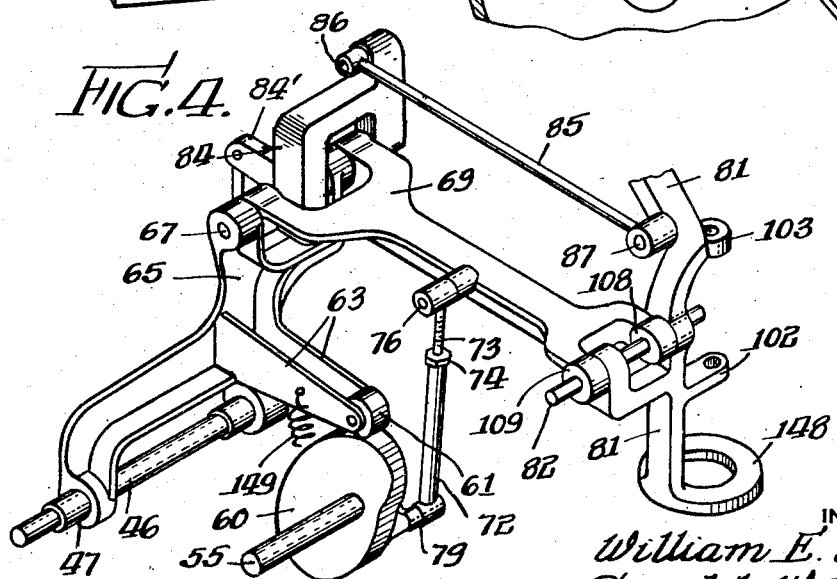
Fig. 4 illustrates a perspective view of the mechanism used to position the knife holding bracket.

With regard to Fig. 2, the V-pulley 45 is keyed to a shaft 46, which in turn is journalled in bearing bushings 47 and 48 secured in a bracket 49. This bracket is secured to the frame members 11, 17 and 18. Also keyed to the shaft 46 is a pinion 50 which drives a gear 51 rotatably mounted upon a stationary shaft 52, which shaft is mounted in the bracket 49. Pinion 53, turning integrally with the spur gear 51, drives a gear 54 which is keyed to a shaft 55 journalled in bearings 56 and 57. A pinion 58, keyed to the shaft 55, drives a gear 59 rotatively mounted on the shaft 52. Sprocket 30 rotates with the gear 59. A cam 60, Figs. 2 and 4, is secured to one extremity of the shaft 55 and provides means for actuating a cam roller 61 journalled upon a pin 62 secured in the extremities of an arm 63 of an oscillating bracket 65. This bracket 65 is pivoted upon bearing bushings 47 and 48 secured in the bracket 49, as hereinbefore set forth. A pin 67, shown in Fig. 4, is secured in an upwardly extending portion of the bracket 65.

The periphery of the cam 60, in conjunction with the roller 61 and arm 63, provides means for oscillating the bracket 65 about its pivot 46, whereby to effect travel of the coring and auxiliary tomato holding means.

Means is provided for raising, and allowing gravity to lower, an arm 69 carrying the coring and holding device. To this end a link or connection consisting of a tubular member 72 is provided, which is adapted to receive a rod 73 in such a manner as to permit the rod freely to move within the tubular member. A lock nut 74, which adjustably threads along a threaded portion of the rod 73, permits adjustment of the position of the contact of said nut with the end of the tube 72. This arrangement of parts permits this connection to function only when the adjustable nut 74 is contacting or exerting pressure against the end of the tube 72. The rod 73 is pivotally secured to a pivoted arm 68 by means of a pin 76. The tubular member 72 is pivotally secured upon the cam 60 by means of a pin 78 rigidly secured in a boss 79 which is located upon the side of the cam 60. A vertically extending bracket 81, which functions at its upper end to provide mounting for various portions of the mechanism, and which functions at its lower end to carry auxiliary tomato holding means and to carry relatively shiftable coring means, is pivotally mounted upon a pin 82 secured in one extremity of the arm 69, as clearly shown in Fig. 4.

A bell crank 84, shown in the upper portion of Fig. 3, pivotally mounted upon the pin 67 secured in the oscillatory bracket 65, is connected to the coring support bracket 81 by means of a link 85. This latter link is pivotally mounted at its extremities upon pins 87 and 86 secured respectively in the bracket 81 and bell crank 84. A link 88, pivotally mounted upon a pin 90 secured in the stationary bracket 49, is pivotally secured to an arm 84' of the bell crank 84, by means of a pin 91.

A coring knife 94, shown in detail in Fig. 7, is positioned in an oscillatable carriage 95. This is accomplished by slotting the carriage at 96 and securing the knife in position by means of a suitable screw 97. Means is provided for shiftably mounting the coring carriage 95. To this end, one extremity of the carriage is pivotally mounted upon a pin 98 secured in an arm 99 of a housing 100 (see Figs. 5 and 6). This housing is conventionally secured to the lower extremity of a continuously rotating tubular shaft 101 journalled in bearings 102 and 103 of the vertically extending bracket 81. Fig. 5 shows the manner in which this tubular shaft 101 has mounted upon it the bevel pinion 105, which pinion in turn is driven by a bevel gear 106 secured to the extremity of a shaft 107. This shaft 107 is journalled in bushings 108 and 109 secured in the bracket 81. A chain sprocket 110 is pinned to the shaft 107, and this sprocket is driven by means of a chain 112 and a double chain sprocket 113 rotatably mounted upon the pin 67. A sprocket 114 serves to tighten the chain 112. The double chain sprocket 113 is driven by means of a chain 115 and a sprocket 116 pinned to the shaft 46 (Fig. 3). A sprocket 117, rotatably mounted upon a pin 118, serves to tighten the chain 115.

The oscillatable coring knife holder, being pivotally mounted upon the pin 98, thereby permits the knife 94 to be moved upwardly or downwardly by means of a yoke 121, pivotally connected to the holder 95 through the registering apertures 122. This link 122 is in turn connected to a rod 123 which is reciprocably mounted within the tubular shaft 101, being out of rotative contact therewith. This rod extends upwardly through the tubular shaft 110 and its upper extremity threadedly passes through apertures 125 of a pin 126. Lower and upper nuts 127 and 128 serve adjustably to secure the threaded extremity of this rod 123 in predetermined position. A link 129 has its lower extremity pivotally connected with the pin 126. The upper extremity of this link is pivotally connected to a pin 130, which in turn connects to a bell crank 131 pivotally mounted at 132 to the upper portion of the bracket 81. A spring actuated rod 134 has one extremity pivotally connected to the opposite end of the bell crank 131 and this rod is reciprocably mounted in an aperture 135 in a pivotally mounted pin 136. The pin is thus mounted in the upper extremity of an upright stationary support 137 mounted on the frame. Springs 138 and 139 are resiliently mounted upon the rod 134 and are positioned upon this rod by the central pivotal pin 136. Washers 144 and 145 and cotter pins 146 and 147 provide abutments on the rod 135, against which one end of the coiled spring abuts. The opposite end of each coiled spring abuts against the side of the pin 136.

By this arrangement, the rod 134 is moved through the aperture in the pivotal pin 136, one or the other of the coiled springs 138 is put under tension, the other having its tension simultaneously lessened. This arrangement provides for a flexible control for automatically actuating the coring knife to cause it to move downwardly and upwardly in a resilient yet automatic manner, it being borne in mind that the tubular shaft 101 is being constantly rotated, and since the coring knife is pivotally mounted upon this rotating housing 100, the rod 123, by being depressed or by being raised, provides means for initiating the coring operation or stopping the coring operation.

It will be apparent from the foregoing construction that means is provided for constantly maintaining the coring shaft in a position always at right angles to the line of movement of the conveyor mechanism and for shiftably moving this coring shaft in a direction parallel to the line of movement of the conveying mechanism. In explanation, viewing Fig. 1, it will be noted that the pins 67, 91 and 90, together with shaft 46, form the corners of a vertically disposed parallelogram. In addition, pins 67, 86 and 87, and shaft 82, Figs. 1 and 4, form the corners of a horizontally disposed parallelogram. This arrangement of parts permits the plunger 123 operating the coring knife, and the tubular shaft 110 rotating the coring knife and also the auxiliary fruit holder 148, to remain constantly perpendicular to the conveyor chain 20. Therefore the knife 94 will always be revolving about an axis normal to the conveyor 20 so as to insure the coring of a tomato in the manner illustrated in Figs. 6 and 8, to wit, so that the tomato, which has been positioned with its stem and core in exact vertical position with respect to the conveyor 20 and the tomato pocket thereof, and which is held in this position by means of the auxiliary, perforated holding or clamping plate 148, will be cut by an instrumentality which is adapted to approach parallel to the core axis of the tomato and to cut the core thereof symmetrically with respect to such axis.

In the automatic operation of the machine, the tomatoes—or any other fruits or vegetables which adapt themselves to the construction and functional operation of the present machine—are placed in the circular pockets 39 of the conveyor 20, with the stem portions facing upwardly, and with a vertical axis passing through the core of a tomato substantially perpendicular to said conveyor. As the tomatoes are carried forward toward the coring station, the bracket 81 is lowered by its own weight, controlled by the action of the tubular link 72 connected to the pin 78 mounted upon the side of the cam 60. In short, under the rotation of the cam 60 the downward movement of the tubular member 72 permits the adjustable nut 74, which rests upon the upper end of the tube 72 by gravity, to cause the carriage 69 to descend progressively by gravity until the auxillary perforated holder 148 comes in contact with the upper surface of a tomato.

The balance of the machine is arranged such that no undue pressure is placed upon the tomato by the contact of the ring 148, except, however, that the weight of the parts is such as to nicely maintain the tomato in firmly held and centered position. Upon contact of the ring 148 with the tomato, the further downward movement of the carriage 69 is stopped, whereas, due to the lost motion connection between the nut 74 and the tube 72, the tube may continue to go on down in proportion to the rotation of the cam 60.

Simultaneous longitudinal motion is imparted to the holding bracket 148 and coring machanism by means of the cam 60 and the roller 61. This roller 61 is firmly held against the cam 60 by a spring 149 secured to the arm 64 of the bracket 65 at one extremity, and to the frame member 17 at the other end. The parts are thus moved longitudinally of and parallel to the path of the conveyor 20, and the arrangement of the cam 60 is such that this longitudinal movement is at a speed equal to that of the conveyor 20. This longitudinal movement is due to the action of the cam 60 pressing against the roller 61, causing the pin 67 and bracket 65 to move toward the forward portion of the machine or toward the right as shown in Fig. 3.

During this movement, the bracket 81 and its arm 133 carrying one end of the rod 134, likewise is moved in the same direction, which through the pin 146 and washer 144 compresses the spring 138, while permitting the rod to slide through the bore in the pivotal pin 136. The spring 138 is thus simultaneously compressed until the total amount of its resilience is reached. At that instant the pressure of this spring 138 is asserted through the bell crank 131 and link 129, whereby to cause the plunger 123 to move downwardly. This action causes the constantly rotating knife 94 to swing downwardly in an arcuate movement and pierce the tomato. The simultaneous rotative action causes the knife in its arcuate swing to cut a conical section from the tomato, as illustrated in Figs. 6 and 8 of the drawings. It will be noted that this conical section is cut about an axis wholly symmetrical to the vertical core axis of the tomato.

Constant rotative movement of the knife is imparted by the drive chains 112 and 115 and the sprockets 116, 113 and 110, cooperating with the bevel gear and pinion 105 and 106, thereby causing the housing 100, holding said knife, to rotate, since it is pinned to the shaft 101.

After the core of the tomato has been severed, the entire coring head is raised upwardly by the tubular portion 72 of the link 71 being raised by the rotating cam 60. The upper portion of the tubular member 72 at this moment presses against the nut 74 of the rod 73. At the same time, continued rotation of the cam 60 causes the arm 64 of the bracket 65 to lower itself, thereby permitting the pin 67 and bracket 65 to move quickly rearwardly or to the left, as shown in Fig. 3, and thus position the knife holder and tomato holding ring 148 above and in registration with the next successive tomato positioned in that pocket to the rearward of the pocket containing the tomato just cored.

It will be evident that during the travel to the left, as viewed in Fig. 3, of the carriage mechanism in the manner hereinbefore described, the other spring 139 will cause the automatic and resilient raising of the knife saddle 95 with respect to the housing 99, whereby withdrawing the knife blade 94 upwardly and ready for its next descending coring operation.

The tomato cores removed by the knife 94 are thrown tangentially from the rotating knife as said knife raises upwardly after the core has been cut from a tomato. Suitable means may be provided in conjunction with the machine for receiving these thrown cores and causing them to be deposited at a predetermined station. The cored tomatoes are carried forward and deposited into the discharge chute 150, secured to the frame member 20 at the forward end of the machine. This chute 150 in turn deposits the cored tomatoes upon another conveyor or any suitable receptacle. It will be noted that the bottom of the discharge chute 150 is made of a multiple of equally spaced rods 151 to permit small pieces or refuse from said tomatoes to be discharged therethrough.

It will thus be seen that we have provided a completely automatic, high-speed machine for automatically transporting a succession of tomatoes in a continuous manner and in spaced apart relation along a predetermined horizontal line of travel, continuously past a coring station, and have provided associated means for holding the tomatoes with their stem axes in exact vertical position, together with complementary automatic means for yieldably contacting the upper portion of each tomato to assist in holding the same in such exact position, together with automatic means continuously operable during the continuous movement of the tomato with its conveyor for descending in a straight-line movement parallel to the core axis of the tomato and moving therewith in parallel relation thereto for coring the tomato as it moves, the line of core severance being formed symmetrically about the core axis, and particularly in a manner to provide for the removal of a conical section from the upper surface of the tomato, the larger portion of the cone being uppermost so as to remove completely the unwanted stem and that portion of the core which is hard and which would tend to impair the flavor of the juice of the tomato.

It will be noted also that by forming this conical pocket in the upper surface of the tomato, we have provided means for retaining any juices that are caused to flow during the severing operation. In addition, by providing resilient means for causing the downward operation of the constantly rotating coring knife in association with a nicely balanced lever structure, we have provided means whereby not only the auxiliary holding ring 148, or its equivalent construction, is brought into contact with the upper surface of the tomato, firmly to hold it, but we have also provided means which prevents an undue squeezing of the tomato and yet which will automatically hold tomatoes of varying sizes without crushing the same, since the holding bracket 148 will descend only until it contacts the upper surface of the tomato, at which time it will stop, despite the fact that the cam 60, which controls this descent, still continues to move downwardly.

In addition, by providing the lowering mechanism for the rotating knife as an independent spring-operated mechanism, we have provided elastic and flexible means for projecting the coring knife downwardly into cutting contact.

It will also be apparent that by reason of the combined parallelogram arrangement of the levers we have provided a very simple, sturdy, dependable and quickly actuating means for insuring that the holding and coring mechanism always approaches the tomato in a direction parallel to the stem axis of the tomato and also moves therewith, and at the same speed as the conveyor, in a direction parallel to the direction of travel of the conveyor, during which time the coring operation is carried out; and that thereafter, without interrupting the movement of the tomato, the holding mechanism and the coring mechanism is withdrawn from contact with the tomato and quickly returned for the next cycle of operations, all in a continuous manner.

It will be understood that wherever the term "tomato" is used in the specification and claims, it includes broadly any type of fruit and/or vegetable which is adapted to be operated upon by the construction herein illustrated and described. It is thought, however, that the device is more particularly adaptable for coring tomatoes.

The invention is hereby claimed as follows:

1. In a device of the class described, the combination of a horizontally movable conveyor providing a plurality of spaced apart holding means each adapted to support a tomato with its stem axis vertically disposed, a coring head adapted to overlie the path of movement of said conveyor, said head including a tomato holding surface provided with an aperture concentrically registering with the core of the tomato when said holding surface is brought into registration with the tomato, a coring knife swingably mounted upon said head about a horizontal axis and adapted to shift arcuately about said axis into contact with a tomato, a drive shaft for said head adapted to rotate about a vertical axis, said drive shaft being hollow, means for rotating said hollow drive shaft, means passing through said drive shaft and connecting with said knife for shifting said knife about its horizontal pivotal axis, lever mechanism including a compression spring adapted under tension to actuate said knife operating mechanism to shift said knife into contact with said tomato, and power actuated levers arranged in parallelogram formation for raising and lowering said head and compressing said knife operating spring, and for causing said head and coring knife to move vertically downwardly into contact with the tomato and thence to move parallel with said tomato while in contact therewith and at the same speed as the speed of said conveying means, for coring the tomato.

2. In a device of the class described, the combination of a frame, tomato conveying means mounted thereon, including a plurality of spaced holding means adapted to move along a horizontal path of travel, a pair of parallelogram systems of levers interconnected and adapted to overlie the path of travel of the conveyor, the free end of said parallelogram having a vertically disposed rotatable hollow spindle head mounted thereon, the lower end of which is adapted to support an apertured plate and is adapted to support a horizontal bearing, a coring knife pivotally mounted on said horizontal bearing and adapted to operate through the aperture of said plate, a rod connected to said pivotal bearing of said knife, extending upwardly through said hollow spindle, means for constantly rotating said hollow spindle, said rotatable means being operable from said shiftable system of levers, linkage mechanism connected to the upper end of said operating rod, a relatively long rod connected to said linkage mechanism, spring mechanism surrounding said rod and adapted to be compressed upon predetermined movement of the rod in either direction whereby to actuate said coring knife to project it toward or withdraw it from a tomato, cam means operated in synchronism with the conveyor travel for shifting said system of levers, including a lost motion connection to permit said head to travel downwardly by gravity, moving in a line at right angles to the movement of the conveyor to approach and contact the tomato, and thence causing said head to move in straight-line motion parallel with the movement of the tomato and at the same speed thereof while said coring knife is in cutting contact with the tomato, and means for thereafter raising said head to withdraw the coring knife from the tomato and for returning the head to its original position.

3. In a device for coring tomatoes, the combination of means for supporting a tomato with its stem axis extending vertically, a curved coring blade, a head comprising an arm for swinging said blade, said arm being pivotal about a horizontal axis, an apertured plate connected to said head in fixed, vertically spaced relationship with respect to said pivot, means for moving said head vertically downwardly parallel to the stem axis of the tomato, whereby to cause said apertured head to contact the upper portion of the tomato, with the aperture thereof concentrically surrounding the core of the tomato, means for rotating said head, and means for vertically swinging said coring knife about its horizontal axis while rotating, to cause it to descend in an arcuate path of travel and cut a conical section from the top of the tomato, the point of the conic section being lowermost.

4. In a device of the class described, the combination of means for holding a tomato with its stem axis extending vertically, an apertured auxiliary holding head adapted to overlie the upper surface of a tomato with the aperture surrounding the core of said tomato and the edges of the aperture being in contact with said tomato, a rotatable coring head disposed above said auxiliary holding means and movable in fixed, spaced relation therewith, said rotatable head having a bearing disposed laterally of the core and horizontally of the stem axis of the held tomato, said horizontal axis being relatively close to the upper surface of said held tomato, an arm pivotally mounted upon a bearing formed at said horizontal axis, a curved, pointed knife mounted on the extremity of said arm and adapted to swing inwardly and downwardly in an arcuate path, moving from the outer portion of the core section and downwardly toward the center of the tomato, means connected to said arm for raising and lowering the arm, and means for rotating said spaced head while said knife is moving downwardly through the tomato, whereby to cut a conical section from the upper portion of said tomato, the base of the section being uppermost.

5. In a device of the class described, the combination of an upright frame, a conveyor moving in a horizontal path along said frame, provided with a plurality of spaced holding means adapted to hold a series of tomatoes each with its stem axis vertically extending, an L-shaped lever pivoted about a horizontal axis disposed along the travel of the conveyor means, with the axis extending horizontally of said conveyor, the upper arm of said lever having a roller bearing, a cam for oscillating said lever about its axis, the upper end of said lever having a pivotal bearing, a substantially horizontally extending arm pivotally mounted upon said upper axis and overlying the path of travel of said conveyor, the outer end of said second mentioned arm having a pivotal bearing, a bracket pivotally depending therefrom and provided with an apertured plate adapted to contact the upper surface of the tomato while in the holding means of the conveyor, with the aperture of the plate adapted to encircle and register with the core area of the tomato, said bracket being provided with supporting bearing means, a vertical hollow spindle rotatably carried by said spindle for rotation about a vertical axis registering with the aperture of said plate, driving means carried by said bracket for continuously rotating said hollow spindle, a knife mounted on said rotating bracket to swing about a horizontal axis, operating means for raising and lowering said arm, including a longitudinally extending member passing through the hollow spindle, the upper end of said bracket including lever mechanism connected to the upper end of said elongated member, an elongated rod connected to the upper end of said lever mechanism, a plurality of compression springs associated with said rod and adapted to be alternately compressed upon longitudinal movement of said last mentioned rod in either direction after a predetermined length of travel thereof, a bell crank lever pivotally connected with the first mentioned pivotal axis of said first mentioned L-shaped lever and extending upwardly therefrom, said bell crank having a horizontally extending arm, the outer end of which is pivotally connected to an arm extending parallel with the upstanding arm of said first mentioned bell crank lever, the opposite end of said arm being pivotally connected to a stationary part of the frame whereby to form a first mentioned vertically extending parallelogram of levers, a second link member connected to the upper end of said bell crank and to said bracket and lying parallel with said second mentioned horizontally extending arm and forming a horizontal, interconnected parallelogram of levers, and a lost motion connection between said second mentioned horizontally extending arm and said cam means for permitting the gravity descent of said apertured plate upon said tomato.

6. In a device of the class described, the combination of conveyor means adapted to travel along a horizontal plane and including a series of devices for holding a succession of tomatoes with their stems extending vertically, a coring head including auxiliary tomato holding means and a rotating coring knife, said knife being adapted to rotate about a vertical axis, a vertically disposed and horizontally disposed parallelogram system of levers interconnected with said head for shifting said head vertically downwardly and then shifting said head horizontally and parallel to the path of movement of said conveyor for coring a tomato, and power means for operating said conveyor and said system of levers in synchronous relation.

7. In a device of the class described, the combination of conveyor means adapted to travel along a horizontal plane and including a series of devices for holding a succession of tomatoes with their stems extending vertically, a coring head including auxiliary tomato holding means and a rotating coring knife, said knife being adapted to rotate about a vertical axis, a vertically disposed and horizontally disposed parallellogram system of levers interconnected with said head for shifting said head vertically downwardly and then shifting said head horizontally and parallel to the path of movement of said conveyor for coring a tomato, and power means for operating said conveyor and said system of levers in synchronous relation, said head including means permitting the auxiliary holding means carried thereby to contact the upper surface of the tomato by gravity and to cause said head to move horizontally and parallel to the conveyor and at the same speed of travel as the conveyor.

8. In a device of the class described, the combination of a conveyor for holding a tomato with its stem axis extending vertically, means for moving the tomato about a horizontal path, a head comprising auxiliary holding means adapted to be brought vertically downwardly into contact with the upper surface of the tomato to hold the same, means to permit said head to descend into contact with said tomato, a knife adapted to rotate about a vertical axis, said axis of rotation moving vertically downward with said head and in predetermined fixed relation therewith, power actuated means for constantly rotating said knife, and power actuated means for shifting said head horizontally parallel to the path of travel of the conveyor means and at the same speed as the conveyor means, spring means resiliently, operatively associated with a relatively fixed portion of the machine and with said movable head for shifting said knife in accordance with the horizontal position of said head in its horizontal path of travel whereby to shift said knife into coring position.

9. In a device of the class described, the combination of conveyor means adapted to travel in a horizontal plane including a series of devices for supporting a succession of tomatoes with their stems extending vertically, a coring head mounted on said device at a predetermined, fixed station adjacent the path of travel of said conveyor for movement in a reciprocating path disposed in said direction of travel, means to reciprocate said coring head in synchronized relation to the movement of each of said holding devices past said station, during which reciprocation the said head moves substantially horizontally parallel to the conveyor and at the same rate of travel as the conveyor, and means on said head for coring a tomato during said last-named movement.

10. In a device of the class described, the combination of conveyor means mounted for movement in a fixed, predetermined path, including a series of devices for supporting a succession of tomatoes with their stems disposed laterally of said path, a coring head mounted on said device at a predetermined, fixed station adjacent the path of travel of said conveyor for movement in a reciprocating path disposed in said direction of travel, means to reciprocate said coring head in synchronized relation to the movement of each of said holding devices past said station, during which reciprocation the said head moves substantially horizontally and parallel to the conveyor, and means on said head for coring a tomato during said last-named movement.

11. In a device of the class described, the combination of conveyor means mounted for movement in a fixed, predetermined path, including a series of devices for supporting a succession of tomatoes with their stems disposed laterally of said path, a coring head mounted on said device at a predetermined, fixed station adjacent the path of travel of said conveyor for movement in a reciprocating path disposed in said direction of travel, means to reciprocate said coring head in synchronized relation to the movement of each of said holding devices past said station, during which reciprocation the said head moves substantially horizontally and parallel to the conveyor, and means on said head for coring a tomato during said last-named movement, said head mounting means comprising a lever mounted upon a fixed portion of the machine.

12. In a device of the class described, the combination of conveyor means mounted for movement in a fixed, predetermined path, including a series of devices for supporting a succession of tomatoes with their stems disposed laterally of said path, a coring head mounted on said device at a predetermined, fixed station adjacent the path of travel of said conveyor for movement in a reciprocating path disposed in said direction of travel, means to reciprocate said coring head in synchronized relation to the movement of each of said holding devices past said station, during which reciprocation the said head moves substantially horizontally and parallel to the conveyor, means on said head for coring a tomato during said last-named movement, said head mounting means comprising a lever mounted upon a fixed portion of the machine, and mounting means associated with said lever for angularly disposing said head in fixed relationship to said path at all operative, arcuate positions of the lever.

13. In a device of the class described, the combination of conveyor means mounted for movement in a fixed, predetermined path, including a series of devices for supporting a succession of tomatoes with their stems disposed laterally of said path, a coring head mounted on said device at a predetermined, fixed station adjacent the path of travel of said conveyor for movement in a reciprocating path disposed in said direction of travel, means to reciprocate said coring head in synchronized relation to the movement of each of said holding devices past said station, during which reciprocation the said head moves substantially horizontally and parallel to the conveyor, and means on said head for coring a tomato during said last-named movement, said corer supporting means comprising a parallelogram linkage construction mounted on a relatively fixed portion of said device and disposing said coring head in fixed, angular relationship to said conveyor.

14. In a device of the class described, the combination of conveyor means mounted for movement in a fixed, predetermined path, including a series of devices for supporting a succession of tomatoes with their stems disposed laterally of said path, a coring head mounted on said device at a predetermined, fixed station adjacent the path of travel of said conveyor for movement in a reciprocating path disposed in said direction of travel, means to reciprocate said coring head in synchronized relation to the movement of each of said holding devices past said station, during which reciprocation the said head moves substantially horizontally and parallel to the conveyor, means on said head for coring a tomato during said last-named movement, said head reciprocating means comprising a cam control mounted on said device, a lever support for said head journaled upon said device for arcuate movement, and means operatively connecting said cam and lever for arcuately shifting said lever about said pivot in timed, synchronous relationship to the passage of each tomato holding device.

15. In a device of the class described, the combination of conveyor means mounted for movement in a fixed, predetermined path, including a series of devices for supporting a succession of tomatoes with their stems disposed laterally of said path, a coring head mounted on said device at a predetermined, fixed station adjacent the path of travel of said conveyor for movement in a reciprocating path disposed in said direction of travel, means to reciprocate said coring head in synchronized relation to the movement of each of said holding devices past said station, during which reciprocation the said head moves substantially horizontally and parallel to the conveyor, means on said head for coring a tomato during said last-named movement, said head reciprocating means comprising a cam control mounted on said device, a lever support for said head journaled upon said device for arcuate movement, means operatively connecting said cam and lever for arcuately shifting said lever about said pivot in timed, synchronous relationship to the passage of each tomato holding device, and power operated means on said device for holding said coring head beyond said tomatoes and for permitting said coring head to move into coring juxtaposition with the tomato during movement therewith.

16. A tomato coring construction for use adjacent a conveyor adapted to convey a succession of tomatoes in a predetermined, straight path, said tomato coring device comprising lever means pivoted to said machine for movement arcuately in said straight path, a coring head, lever means operatively supporting said coring head upon said first-named lever, said second-named lever being pivotally associated with said first-named lever, means operatively connected with said first-named lever for angularly reciprocating said lever in synchronization with said conveyor to cause said head to reciprocate in a path comprising synchronous movement with each of said succession of tomatoes, and power-operated means operatively associated with said reciprocating means and operable in synchronism therewith for angularly shifting said second-named lever to bring said head into operative association with each tomato during synchronous movement therewith.

17. A tomato coring construction for use adjacent a conveyor adapted to convey a succession of tomatoes in a predetermined, straight path, said tomato coring device comprising lever means pivoted to said machine for movement arcuately in said straight path, a coring head, lever means operatively supporting said coring head upon said first-named lever, said second-named lever being pivotally associated with said first-named lever, means operatively connected with said first-named lever for angularly reciprocating said lever in synchronization with said conveyor to cause said head to reciprocate in a path comprising synchronous movement with each of said successions of tomatoes, and power-operated means operatively associated with said reciprocating means and operable in synchronism therewith for angularly shifting said second-named lever to bring said head into operative association with each tomato during synchronous movement therewith, said lever being associated with a parallelogram linkage construction operatively connected to the frame of the machine for maintaining said coring head in predetermined, angular relationship with respect to said conveyor.

18. In a device of the class described, the combination of conveyor means adapted to travel along a fixed, predetermined path and including a series of devices for holding a succession of tomatoes with their stems extending laterally of said path, a coring head including auxiliary tomato holding means and a rotating coring knife, said knife being adapted to rotate about a laterally extending axis, a parallelogram system of levers interconnected with said head and a relatively fixed portion of said device for shifting said head laterally and then shifting said head parallel to the path of movement of said conveyor for coring a tomato, and power means for operating said conveyor and said system of levers in synchronous relation.

19. In a device of the class described, the combination of a conveyor arranged for movement in a predetermined path and comprising means for holding a tomato with its stem axis extending laterally to said path, a coring head adapted to be brought laterally toward said path into contact with the upper surface of a tomato to core the said tomato, means mounting said head upon the device for movement with said tomato during coring, power actuated means for shifting said head parallel to the path of travel of the conveyor means, a shiftable coring knife mounted on said head, and means operatively connected with said head and with a relatively fixed portion of the machine for shifting said coring knife into coring position in accordance with the position of said head in said path of travel.

20. In a device for coring tomatoes, the combination of means for supporting a tomato with its stem axis extending vertically, a coring head comprising auxiliary holding means shiftable to position to clampingly hold a tomato against said support, a coring blade mounted on an arm swingable with respect to said holding means, said arm being pivotal about a horizontal axis disposed in a vertically fixed position with respect to said holding means, means for moving said head downwardly to cause the holding means to contact the upper portion of the tomato, means for rotating said blade, and means for swinging said coring blade about its horizontal axis to core said tomato after said holding means has holdingly engaged said tomato.

WILLIAM E. URSCHEL.
GERALD W. URSCHEL.